United States Patent [19]

Norris

[11] 4,217,573

[45] Aug. 12, 1980

[54] SWITCHING UNIT FOR SELECTIVELY CONNECTING TOGETHER VARIOUS COMBINATIONS OF AUDIO SUBSYSTEMS

[76] Inventor: Elwood G. Norris, 1520 Canterbury Dr., Salt Lake City, Utah 84108

[21] Appl. No.: 27,253

[22] Filed: Apr. 5, 1979

[51] Int. Cl.[2] .................................... H04Q 3/00

[52] U.S. Cl. ........................ 340/147 R; 340/147 LP

[58] Field of Search ......... 340/147 R, 147 LP, 147 T; 84/DIG. 1, DIG. 27; 179/1 B, 1 S, 1 W

[56] References Cited

U.S. PATENT DOCUMENTS 3,675,205 7/1972 Mereen ........................... 340/147 C

*Primary Examiner*—Harold I. Pitts

*Attorney, Agent, or Firm*—Thorpe, North & Gold

[57] ABSTRACT

A switching unit selectively couples together various combinations of audio subsystems from three or more different groups of such subsystems, to thereby allow a complete audio system to be "constructed" for use. The switching unit is designed to be used in sales showrooms or similar environments where it is desired to demonstrate several different combinations of audio subsystems. The switching unit permits any one subsystem of a first group, typically source subsystems such as turntables, tuners, and tape-decks, to be connected to any one subsystem of a second group, typically amplifier subsystems. The switching unit further permits the subsystem of the second group to be connected to any one subsystem of a third group, typically speaker subsystems. The selection of the particular subsystems from each group may be controlled by a hand-held remote selector, thereby allowing the user thereof to walk around the showroom floor as the various selections are made.

14 Claims, 5 Drawing Figures

SWITCHING UNIT FOR SELECTIVELY CONNECTING TOGETHER VARIOUS COMBINATIONS OF AUDIO SUBSYSTEMS

BACKGROUND OF THE INVENTION

This invention relates to a switching unit for selectively coupling together various components or subsystems of an audio system to form a complete system for demonstration or similar purposes.

Typically, there are at least three main subsystems of any complete audio system: a source subsystem such as a turntable, tape-deck, cassette recorder, or turner; an amplifier subsystem; and a speaker subsystem. Such subsystems, while forming an integral part of the complete audio system, are often sold separately. However, because it is difficult for a potential purchaser to judge the quality of a particular subsystem standing alone, a sales showroom will usually demonstrate the performance of a particular subsystem by hand connecting it to the other essential subsystems of the audio system. For example, one who wishes to purchase a turntable will generally desire that the turntable under consideration be demonstrated by connecting it to an amplifier and speakers, thereby allowing the purchaser to make a judgment as to the turntables suitability for his particular needs. Once the purchaser has found a turntable model to his liking, he may still wish to experiment with different combinations of amplifiers and speakers that could be used with it.

For audio system sales personnel, such experimentation with the various combinations of three or more basic subsystem groups requires extensive connecting and disconnecting of the demonstration models belonging to each group. Not only does such activity consume much time, but also it results in wear of the equipment. Moreover, and perhaps more importantly, it becomes difficult for the potential buyer to remember the performance level of a previous combination of subsystems when a significant time interval occurs between the previous demonstration and the demonstration of a new combination.

For the reasons which are apparent from the above, a switching device to which demonstration models from each subsystem group could be attached, and which would automatically interconnect selected combinations of these subsystems by command, would be a valuable asset to those who sell and demonstrate audio systems.

The prior art, to my knowledge, does not disclose a switching unit for selecting and coupling together subsystems from three different groups of subsystems. The Mereen U.S. Pat. No. 3,675,205, discloses a push-button control unit for use in controlling various electronic devices. The push-button control unit is used to first selectively connect the unit to one of the electronic devices. Then the control unit is used to control the selected device. However, no provision is made for selecting and coupling together electronic devices (subsystems) from three different groups of devices, as contemplated by the invention disclosed herein.

SUMMARY OF THE INVENTION

The present invention is illustrated in a specific embodiment of a switching unit used to control the coupling together of audio subsystems from three or more separate groups of subsystems in order to form a complete audio system. The switching unit includes a hand-held remote unit connected to a switching circuit which, in turn, is connected to the different subsystems of each group. The hand-held unit includes manually operable keys or switches which the user operates to cause connection of the selected subsystems. When these keys or switches are operated, signals are applied by the hand-held unit to the switching circuit directing the switching circuit to electrically couple together the subsystems identified by the signals.

BRIEF DESCRIPTION OF THE DRAWINGS

For a better understanding of the present invention, together with the objects and features thereof, reference is made to the following detailed description presented in connection with the accompanying drawings described as follows.

DETAILED DESCRIPTION

Figure 1:
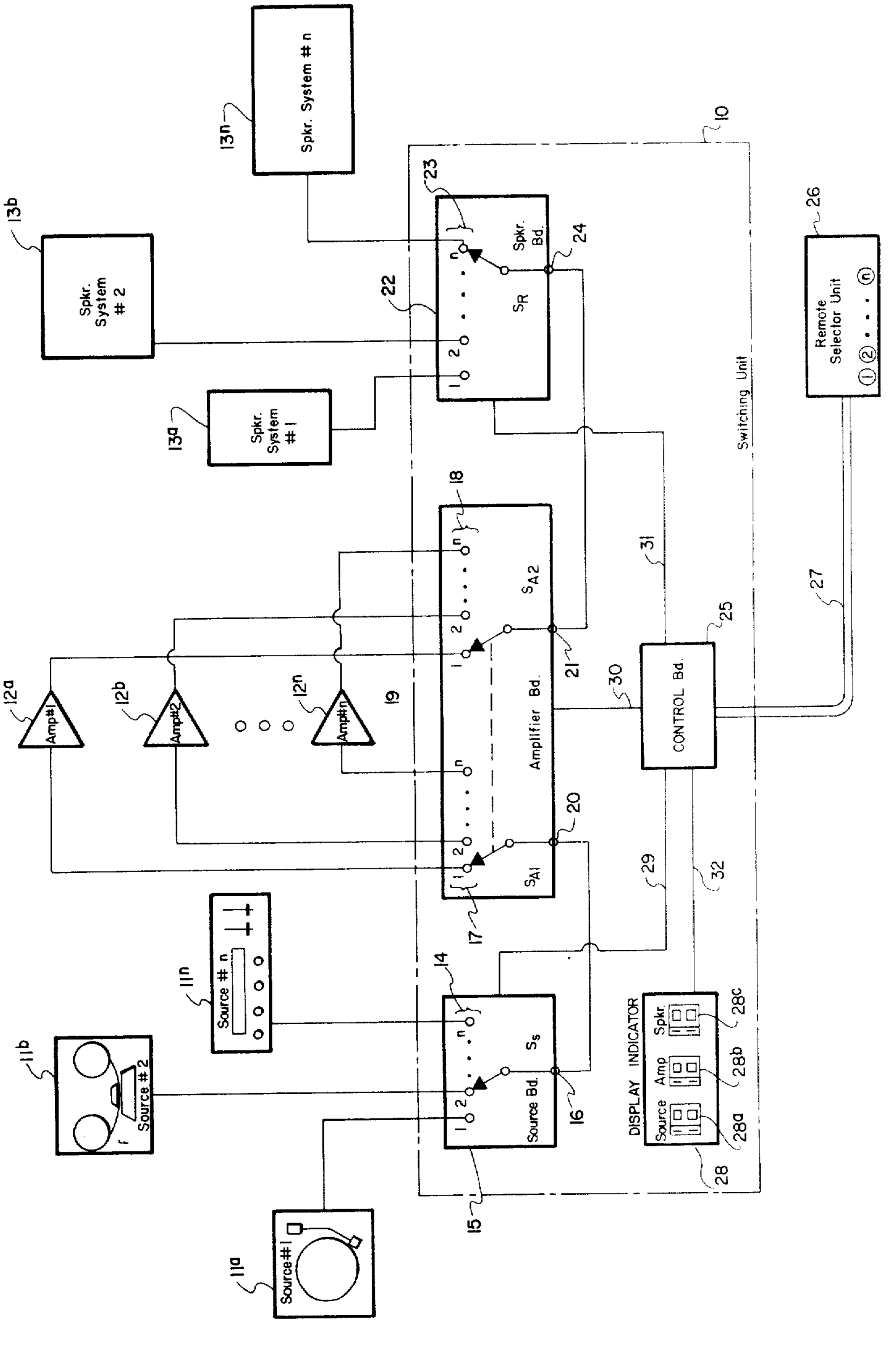
FIG. 1 is a system block diagram of one illustrative embodiment of the present invention.

Referring to FIG. 1, there is shown a switching unit 10 connected to a plurality of source subsystems 11*a*, 11*b*, . . . 11*n*, a plurality of amplifier subsystems 12*a*, 12*b*, . . . 12*n*, and a plurality of speaker subsystems 13*a*, 13*b*, . . . 13*n*. The source subsystems 11 produce audio signals, and include such conventional units, as turntables, tape-decks, cassette players, microphones, or turners. The amplifier subsystems 12 amplify and condition the audio signals produced by the source subsystems 11 in a conventional fashion. The speaker subsystems 13 convert (in a well known manner) the amplified and conditioned audio signals of the amplifier subsystems to a desired form such as sound waves.

Included in the switching unit 10 are a source board 15, an amplifier board 19, a speaker board 22, and a control board 25. The outputs of the source subsystems 11 are applied to separate source board input terminals 14 located on the source board 15. A switch Ss is provided on the source board 15 for connecting selected source board input terminals 14 to an output port 16. Although single leads, terminals and ports are shown connecting the various elements together of FIG. 1, it should be understood that such leads, terminals and ports represent or may represent multiple leads, terminals or ports.

The source board output port 16 is connected to an amplifier board input port 20 located on the amplifier board 19. A switch SA1 is provided on the amplifier board 19 for connecting the amplifier board input port 20 to selected ones of a plurality of amplifier board input terminals 17. Each amplifier board input terminal 17 is connected to the input of a different amplifier subsystem 12.

The outputs of the amplifier subsystems 12 are applied to separate amplifier board output terminals 18 located on the amplifier board 19. A switch SA2 is provided on the amplifier board 19 for connecting one of the amplifier board output terminals 18 to an amplifier board output port 21. The amplifier board output port 21 is connected to a speaker board input port 24 located on the speaker board 22. A switch SR connects the speaker board input port 24 to one of a plurality of speaker board output terminals 23. Each speaker board output terminal 23 is connected to the input of a speaker subsystem 13.

A remote selector unit 26, connected to the control board 25 by means of a connecting cable 27, is provided to enable a user to manually select which combination of source subsystems, amplifier subsystems and speaker subsystems he desires to play. Signals from the remote selector unit 26 are applied to the control board 25 which generates control signals for application to the source board 15, amplifier board 19 and speaker board 22 via leads 29, 30 and 31 respectively. These control signals control the setting of switches Ss, SA1 and SA2, and SR and thus the coupling together of the different subsystems to which the switches are connected. The operation of these switches in response to control signals will be described in connection with FIG. 4.

Still referring to FIG. 1, the control board 25 also generates a set of indicator signals for application to a display indicator 28 via lead 32. The indicator 28 indicates or displays on display elements **28*a*, 28*b* and 28*c* which subsystems have been connected together. The display elements 28*a*, 28*b* and 28*c* could illustratively be light-emitting diodes or similar display devices. The subsystems in each group might be assigned a number and then when that number on the remote selector unit 26 is pressed to connect the corresponding subsystem, that number is displayed on the display indicator 28 by the appropriate one of elements 28*a*, 28*b* or 28*c***.

Figure 2:
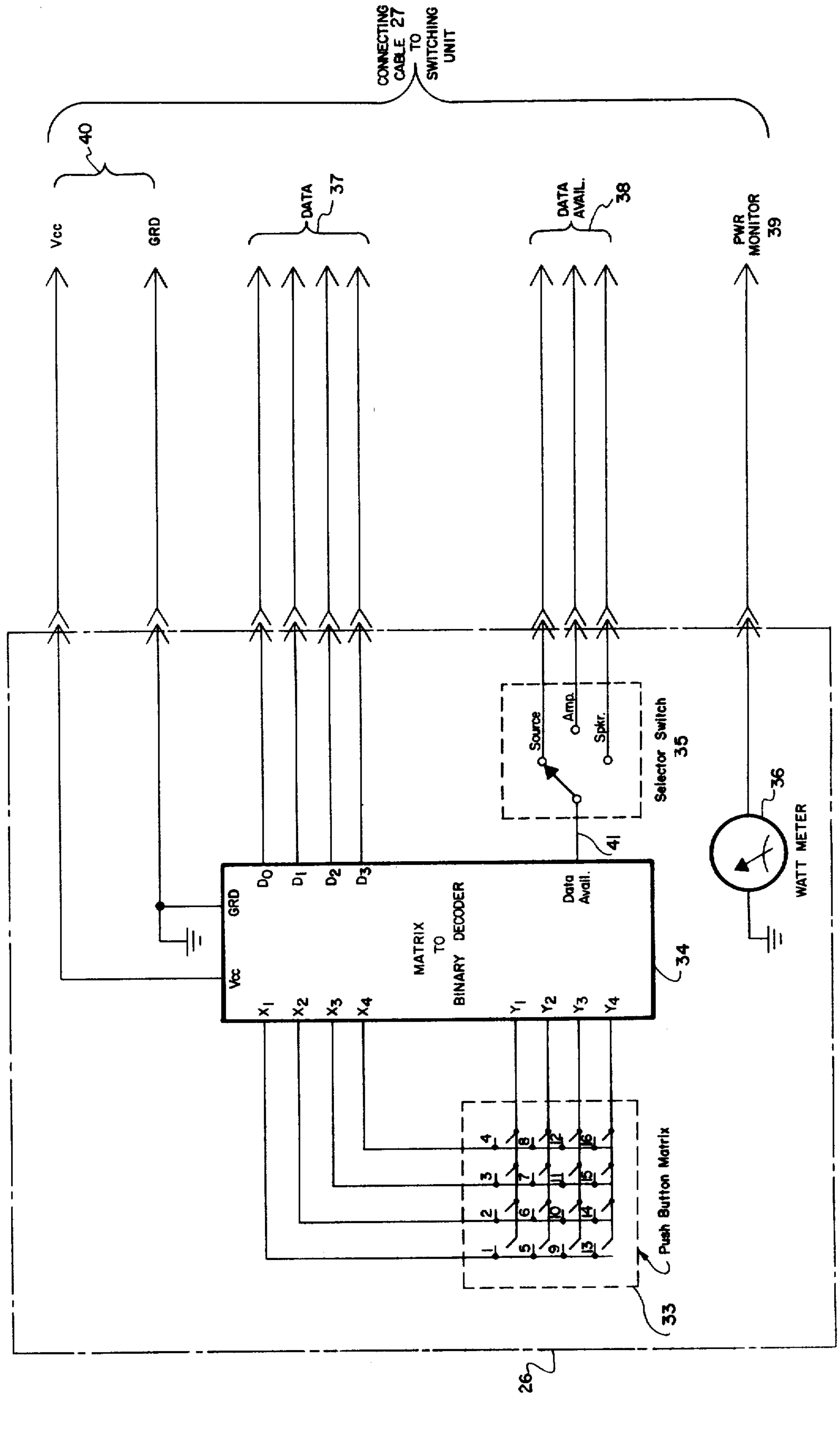
FIG. 2 is a schematic showing one illustrative embodiment of the remote selector unit and connecting cable of FIG. 1.

The remote selector unit 26, shown in FIG. 2, includes a push button matrix 33, a matrix-to-binary decoder 34, a manually operable selector switch 35, and a watt meter 36. The push button matrix 33 is coupled to the inputs of the matrix-to-binary decoder 34 (which is a conventional decoder) in such a fashion that a binary coded decimal (BCD) signal appears at the outputs $D_0$, $D_1$, $D_2$ and $D_3$ thereof to represent the particular button(s) pushed. This BCD signal is applied to the switching unit 10 (FIG. 1) by a set of data lines 37 located within the connecting cable 27.

An additional output of the matrix-to-binary decoder 34 is a "data available" signal which indicates the presence of BCD data at the decoder's output. This data available signal is applied by lead 41 to the pole of a single-pole, triple-throw selector switch 35. The three stationary terminals of the selector switch 35 are each connected to a separate one of three data available lines 38 within the connecting cable 27, thereby allowing the data available signal to be routed to the control board 25 (FIG. 1) of the switching unit 10.

Also included within the remote selector unit 26 is a watt meter 36 whose function is to indicate to the user thereof the amount of power being delivered by the selected amplifier subsystem to the selected speaker subsystem. Circuitry 50 is provided within the switching unit 10 (see FIG. 3) for generating a power monitor signal 39 whose magnitude is proportional to this delivered power. This power monitor signal 39 may be sent to a watt meter 36 located within the remote selector unit 26 through a power monitor line located within the connecting cable 27, as shown in FIG. 2, or it may be sent to a watt meter located elsewhere.

Voltage and ground lines 40 are also included within the connecting cable 27. These voltage and ground lines permit specified power to be sent to the matrix-to-binary decoder 34 from power supplies located in a remote location, such as from within the switching unit 10.

When it is desired to select a certain source subsystem, the selector switch 35 is placed in the "source" position and then the appropriate push button(s) of matrix 33 identifying the selected subsystem is depressed. The desired amplifier subsystem may then be selected by setting switch 35 in the "amp" position and pushing the appropriate button(s) of matrix 33. The desired speaker subsystem is selected by setting switch 35 to the "Spkr" position and pushing the appropriate button(s). After these operations are completed, the selected source, amplifier and speaker subsystems are coupled together for playing.

Figure 3:
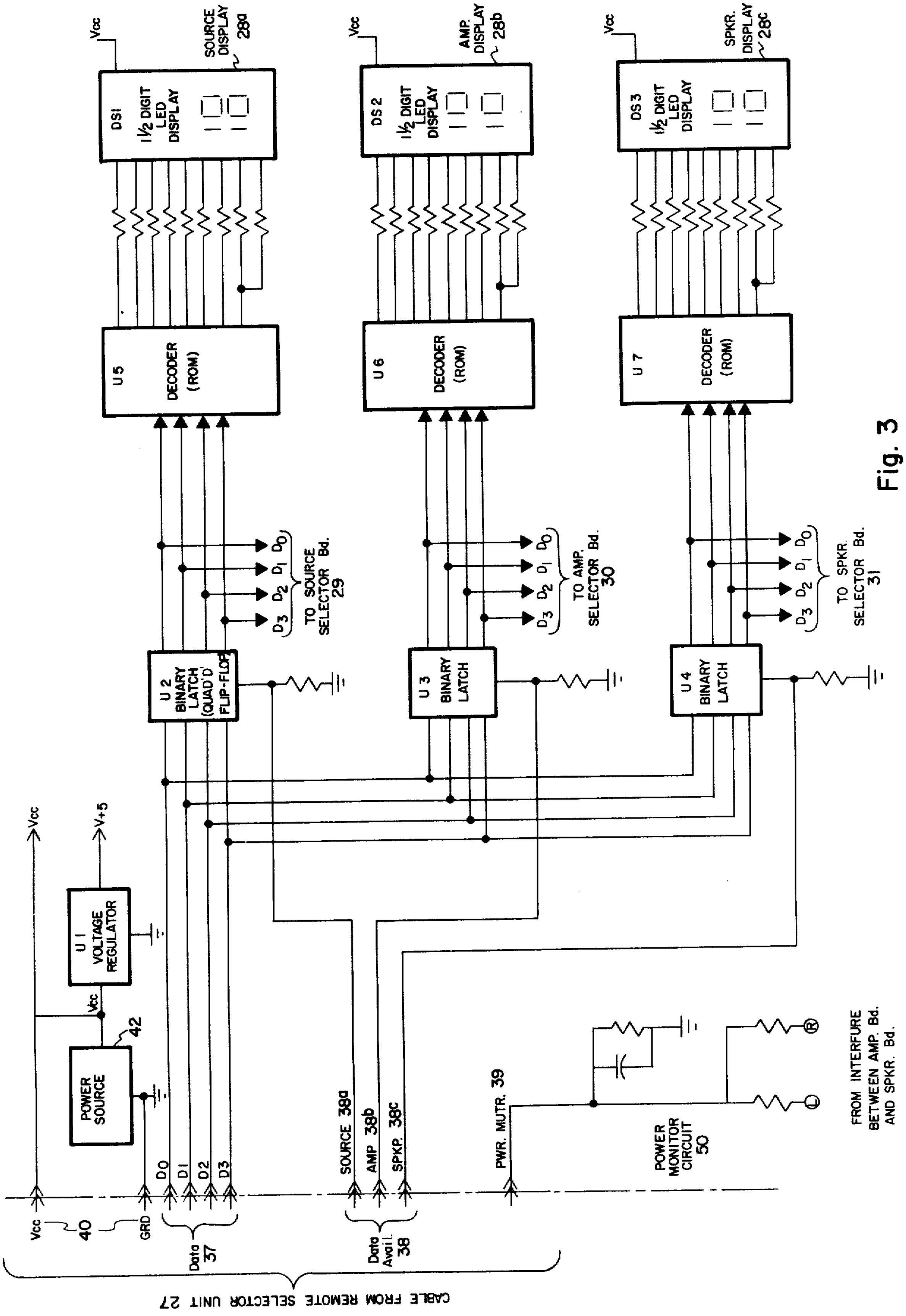
FIG. 3, which should be positioned to the right of FIG. 2, shows one illustrative circuit configuration of the control board shown in FIG. 1.

FIG. 3 shows a specific illustrative circuit configuration of the control board 25, of FIG. 1. The data lines 37 from the remote selector unit 26 (FIG. 2) are connected in parallel to three separate binary latches. U2, U3 and U4. These binary latches, as disclosed in this preferred embodiment of the invention, are commercially available integrated circuits, sometimes referred to as "Quad 'D' Flip-Flops." The purpose of the binary latches U2, U3, and U4 is to store the data appearing on the data lines 37 when an enabling signal is also present. Such an enabling signal is provided by the data available signals 38, generated by the remote selector unit 26 (FIG. 2). The source data available line **38*a*, which line has an enabling signal thereon when the selector switch 35 (FIG. 2) is in the "source" position, is connected to binary latch U2. Therefore, whenever the selector switch 35 is set in the "source" position, the source binary latch U2 is enabled, and whatever BCD data appears on the data lines 37 will be stored in the latch. In a similar fashion, amplifier data available line 38*b* is coupled to amplifier binary latch U3, thereby allowing BCD data appearing on the data lines 37 to be stored in amplifier binary latch U3 whenever the selector switch 35 (FIG. 2) is set to the "amp" position. Speaker data available line 38*c* is similarly coupled to speaker binary latch U4, permitting BCD data from the data lines 37 to be stored therein when the selector switch 35 (FIG. 2**) is placed in the "spkr" position.

The coded data stored in the binary latches U2, U3, and U4 is continuously available at the outputs thereof. This output data represents the control signals appearing on leads 29, 30 and 31 (FIG. 1) used to control and cause the setting of the switches located on the source board 15, amplifier board 19, and speaker board 22.

These control signals are also directed to separate decoders U5, U6 and U7. Each decoder decodes the data so that it may be visually displayed by the display indicator 28 (FIG. 2). To illustrate, the output from the source decoder U5 is connected to a source display indicator **28*a*, located in a visable location on the switching unit 10. This source display indicator 28*a***, as previously indicated, could illustratively be a light emitting diode (LED) display capable of visually displaying the numerals "0" through "9" for the one's digit, and a blank or a "1" for the ten's digit.

The source decoder U5 is designed so that the number displayed by the source display indicator **28*a* is the decimal equivalent of the BCD data stored in the source binary latch U2. This BCD data, in turn, is a binary coded equivalent of the number keyed into the push button matrix 33 located on the remote selector unit 26 (FIG. 2) when the selector switch 35 is placed in the "source" position. Hence, the number displayed on the source display indicator 28***a* will be the same number keyed into the push button matrix 33 (FIG. 2) when the selector switch 35 is set on the "source" position. This number identifies the source subsystem selected by the user.

In a similar fashion, the output from the amplifier decoder U6 is connected to an amplifier display indicator 28*b*, and the output from the speaker decoder U7 is connected to a speaker display indicator 28*c*. As described above with respect to the source display indicator 28*a*, the numbers displayed by the amplifier display indicator 28*b*, and the speaker display indicator 28*c*, will correspond to the number keyed into the push button matrix 33 when the selector switch 35 is respectively placed in the "amp" and "spkr" positions (FIG. 2). These numbers identify respectively the amplifier subsystem and speaker subsystem selected by the user.

FIG. 3 also illustrates how the power supply voltages used throughout the switching unit 10 are generated. A power source 42, located outside the switching unit 10, provides the basic supply voltage $V_{cc}$ used throughout the switching unit 10, including the remote selector unit 26. A voltage regulator U1 converts the supply voltage $V_{cc}$ to another voltage level needed by various components within the switching unit 10. This regulated voltage, labeled as "$V_{+5}$" in FIG. 3, is used to power all the integrated circuits used within the switching unit 10 except those where it is indicated otherwise (see FIGS. 2, 3 and 4).

Figure 5:
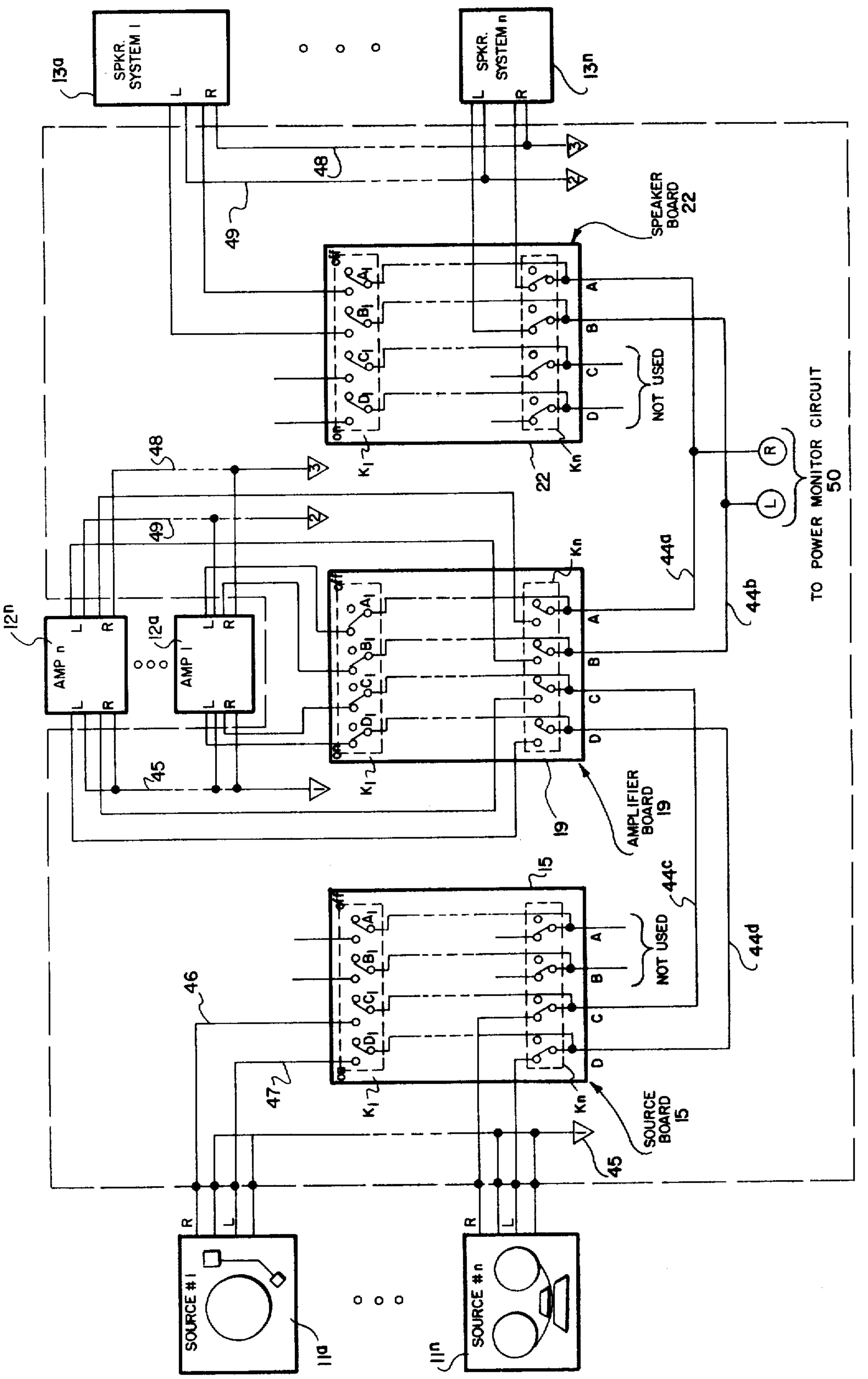
FIG. 5 shows one illustrative wiring arrangement for connecting together the various source subsystems, amplifier subsystems, and speaker subsystems of the invention.

The system of the present invention is designed such that the source board 15, the amplifier board 19, and the speaker board 22 (FIG. 1) may be identical. That is, each board is designed with the capacity to selectively connect to both an input of an audio subsystem and an output of an audio subsystem, as is the case with the amplifier board 19 in FIG. 1. This identicalness of the three boards is best seen in FIG. 5. However, in the configuration shown in FIG. 1, and also seen in FIG. 5, the source board 15 does not use its capacity to selectively switch to the input of an audio subsystem due to the nature of the source subsystems 11 to which it is connected, such source subsystems having no input of the type under discussion here. Similarly, the speaker board 22 does not use its capacity to selectively switch to the output of an audio subsystem due to the nature of the speaker subsystems 13 to which it is connected, such speaker subsystems having no output of a type needing further connection. However, should a different type of audio subsystem be inserted in place of the speaker subsystem 13 which did have an output signal which needed to be applied to some other system, it would be a simple matter to employ the unused half of the speaker board to direct the output signal to such other system. Thus, although the discussion here of the preferred embodiment of the invention discloses three audio subsystems that are selectively connected in series, the invention contemplates any number of audio subsystems so connected.

Figure 4:
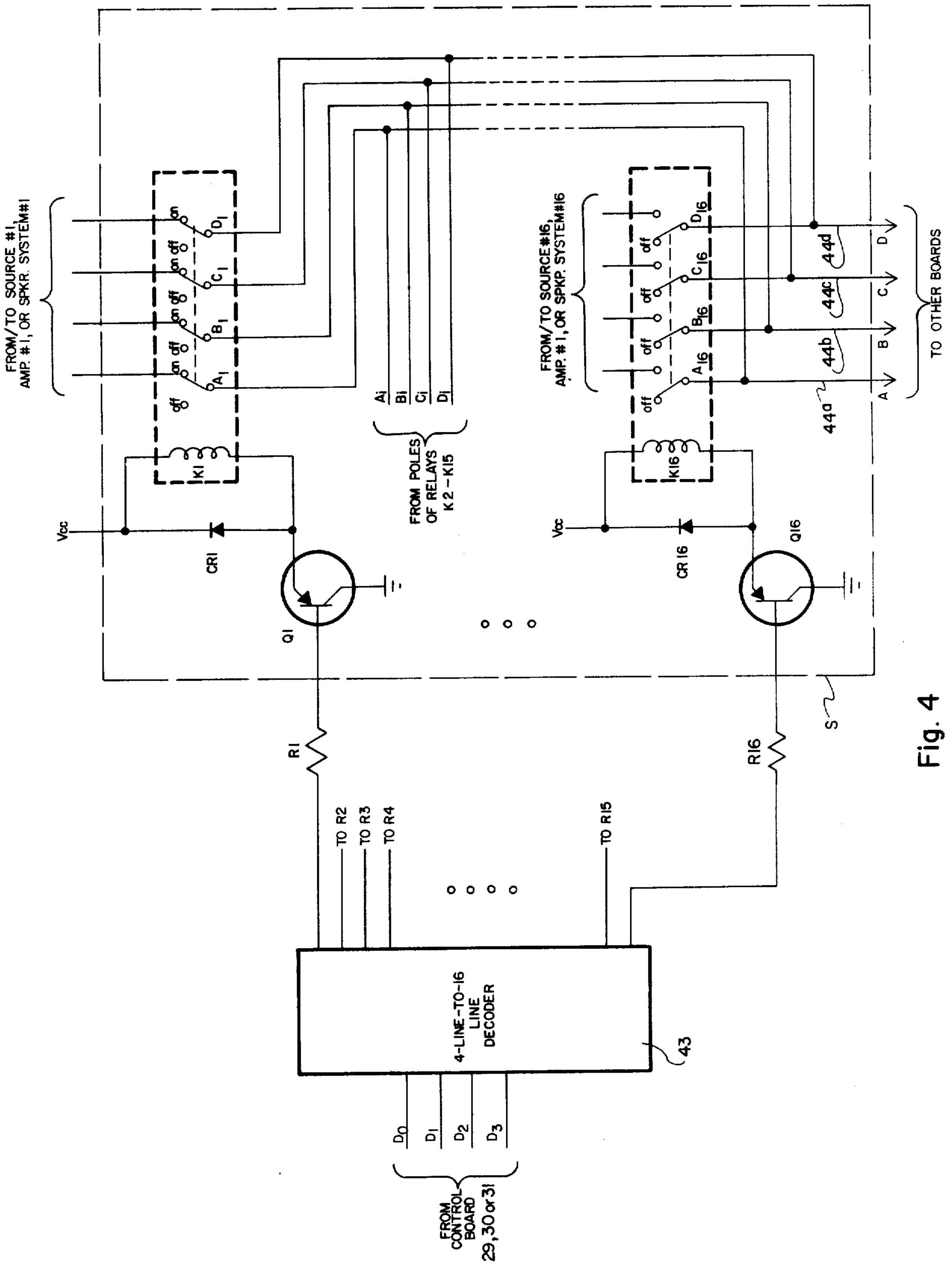
FIG. 4 shows one illustrative circuit configuration of the switching arrangement employed by the source board, amplifier board, and speaker board shown in FIG. 1.

FIG. 4 shows an illustrative circuit configuration suitable for use as the source board 15, the amplifier board 19, or the speaker board 22. The circuitry disclosed contemplates a group of up to sixteen source subsystems 11, amplifier subsystems 12, or speaker subsystems 13, from each group of which one subsystem is to be selectively connected in series. The selection circuitry employed in the circuit board of FIG. 4 includes sixteen identical 4-pole, double-throw relays K1 through K16, only two of which are shown in FIG. 4; sixteen identical relay-driver circuits, only two of which are shown in FIG. 4, each including a diode CR1 (or CR16), a transistor Q1 or (Q16, and a resistor R1 (or R16); and a single 4-line-to-16-line decoder 43.

Control signals from the control board 25 (FIG. 1 and FIG. 3) are received on inputs D0, D1, D2 and D3 of the 4-line-to-16-line decoder 43, in response to which the decoder 43 energized one, and only one, of its sixteen outputs for each of the sixteen possible BCD combinations that may appear on the four input lines. Energizing one of the outputs of the decoder 43 serves to bias a corresponding transistor, such as transistor Q1, to the "on" condition to allow electrical current to flow from the voltage supply $V_{cc}$ through a coil of a relay, such as relay K1, and through a transistor, such as transistor Q1, to ground. With current flowing through the coil of a relay, the four corresponding switches such as A1, B1, C1 and D1, are thrown from their normal "off" position to their "on" position, thus effectuating the desired switching operation. It will be recognized that the circuitry S of FIG. 4 is represented by a single switch element, such as switches Ss, SA1, SA2 or SR, in the FIG. 1 diagram.

The sixteen 4-pole, double-throw relays, K1 through K16 (FIG. 4), are coupled together such that the poles of corresponding switches within each relay are tied in common. Thus, the pole of switch A1 in relay K1 is connected to the pole of switch A16 in relay K16, etc. These poles tied together form common trunk lines 44*a*, 44*b*, 44*c* and 44*d*. These common trunk lines correspond to the board output ports 16 or 21, or the board input ports 20 or 24, referred to in the discussion of FIG. 1.

A specific illustrative arrangement interconnecting the source subsystems 11 to the source board 15, the amplifier subsystems 12 to the amplifier board 19, the speaker subsystems 13 to the speaker board 22, as well as for interconnecting together the source board 15, the amplifier board 19, and the speaker board 22, is shown in FIG. 5. As shown in FIG. 5, a particular source subsystem will likely have at least two outputs, one for a left channel and one for a right channel, each channel requiring two separate connections, one for a signal line and one for a return line (ground). The return lines associated with both channels of the source subsystems 11 are all tied together within the switching unit 10 to form a common source subsystem ground 45. The signal lines, on the other hand, are individually coupled to the "on" terminals (FIGS. 4 and 5) of the relay switches of the source board 15. A right channel signal line 46 (FIG. 5) of the first source subsystem 11*a* is connected to a switch $C_1$ located within relay K1. Similarly, a right channel signal line of an ith source subsystem is connected to a switch $C_i$ located within relay $K_i$, where i is an integer from 1 to n, n representing the maximum number of source subsystems that may comprise the audio subsystem group (n is sixteen in the preferred embodiment described in FIG. 4). A common trunk line 44*c* thus represents the source board output port 16 (FIG. 1) for the right channel.

In a similar fashion, a left channel signal line 47 of the first source subsystem 11*a* is connected to a switch $D_1$ located within relay K1. Likewise, the left channel signal line of the ith source subsystem is connected to switch $D_i$ located within relay $K_i$. Hence, a common trunk line 44d represents the source board output port 16 for the left channel.

The common trunk lines 44c and 44d on the source board 15 are connected to their couterparts on the amplifier board 19. The "on" terminal (FIGS. 4 and 5) of switch $C_i$ of relay $K_i$ on the amplifier board 19 is individually connected to the right channel input of the ith amplifier subsystem 12. Correspondingly, the "on" terminal of switch $D_i$ of relay $K_i$ on the amplifier board 19 is individually connected to the left channel input of the ith amplifier subsystem 12. To complete the input connection to the ith amplifier subsystem 12, a common source subsystem ground 45 provides the ground signal for both the right and left channel inputs.

The output signals from the amplifier subsystems 12 are connected to the amplifier board 19 in much the same fashion as the source subsystems 11 are connected to the source board 15. That is, a right channel signal line from the ith amplifier subsystems 12 is coupled to the "on" terminal of switch $A_i$ of relay $K_i$ on the amplifier board 19. Similarly, a left channel signal line from the ith amplifier subsystem 12 is coupled to switch $B_i$ of relay $K_i$. A common trunk line 44a thus represents the amplifier board output port 21 (FIG. 1) with respect to the right channel, while a common trunk line 44b represents the amplifier board output port 21 with respect to the left channel. The ground signals associated with the outputs from the right channel of the amplifier subsystems 12 are tied together to form a common right amplifier subsystem ground 48. Similarly, the ground signals associated with the outputs from the left channel of the amplifier subsystems 12 are tied together to form a common left amplifier subsystem ground 49.

The common trunk lines 44a and 44b on the amplifier board 19 are connected to their counterparts on the speaker board 22. Each of these common trunks lines is also connected to a power monitor circuit 50, shown in FIG. 3. The power monitor circuit 50 consists of a passive network designed to produce a power monitor signal 39, the magnitude of which is proportional to the average power delivered by the two channels from the amplifier subsystems 12 to the speaker subsystems 13.

Referring again to the speaker board 22 shown in FIG. 5, it is seen that the "on" terminal of switch $A_i$ of relay $K_i$ is individually connected to the right channel input of the ith speaker subsystem 13. Also coupled to this right channel input is a return line tied to a common right amplifier subsystem ground lead 48. Correspondingly, the "on" terminal of switch $B_i$ of relay $K_i$ is individually connected to the left channel input of the ith speaker subsystem 13. A return line tied to a common right amplifier subsystem ground lead 49 is also coupled to this left channel input.

Although the preferred embodiment of the invention herein disclosed only shows a capacity to handle audio systems of two channels, the invention contemplates a capacity of handling audio systems of more than two channels, such as four channel and eight channel audio subsystems. The increased capacity necessitated by selectively connecting the subsystems of such multichannel audio systems could be simply obtained, for example, by increasing the effective size of the relays (FIG. 4) from 4-pole, double-throw to 8-pole, double-throw, or to 16-pole, double-throw, as required.

Moreover, in reference to the entire disclosure, which in general has described a specific detailed embodiment of the present invention, it is apparent that numerous alternative embodiments and modifications could be devised by those skilled in the art and that such alternative embodiments and modifications would fall within the scope of the invention. The appended claims are intended to cover all such apparent and obvious modifications.

What is claimed is:

1. A switching unit for selectively coupling in series m electronic subsystems, where m is an integer greater than two, and where each subsystem in series is selected from a different one of m groups of subsystems, said unit comprising a portable signal generating means of a size which may be held in a person's hand, said signal means being manually operable to produce signals identifying the subsystems to be coupled together, switch means coupled to each subsystem in each group and responsive to control signals for electrically connecting together selected subsystems from each group, and control means responsive to said identifying signals for supplying control signals to said switch means to cause the switch means to connect together the subsystems identified by said identifying signals.

2. A switching unit as in claim 1 wherein said signal generating means comprises a manually operable m position selector switch for producing m signals, each signal corresponding to a different setting of the switch and each identifying a different one of the m groups, a plurality of manually operable switches for producing a plurality of signals, each of which, for each setting of the selector switch, identifies a different one of the subsystems in the group identified by the selector switch setting, and means for applying said m signals and said plurality of signals to said control means.

3. A switching unit as in claim 2 wherein said plurality of manually operable switches comprises a push-button matrix of switches, and a matrix-to-binary decoder coupled to the matrix for producing binary signals corresponding to the operation of different ones of the push-button matrix of switches.

4. A switching unit as in claim 2 further including a power monitor circuit, means for coupling the power monitor circuit to the output of one of the selected subsystems, and watt meter means coupled to the power monitor circuit for providing a visual indication of the power supplied to the output of said selected subsystem.

5. A switching unit as in claim 4 wherein said watt meter means is disposed in said signal generating means.

6. A switching unit as in claim 1 wherein said control means includes memory means for storing signals produced by said signal generating means, and decoder means for decoding the signals stored in the memory means to produce said control signals, and wherein said switch means includes m switch arrays, each of which is coupled to the subsystems in a different one of said groups, means coupling the switch arrays together, and means in each switch array and responsive to said control signals for electrically connecting selected subsystems from each group to said switch array coupling means.

7. A switching unit as in claim 1 further including display means responsive to said control signals for producing visual indications identifying the subsystems which are identified by said identifying signals.

8. A switching unit as in claim 1 wherein said display means comprises m light-emitting diode display devices for producing visual indications of the m subsystems selected for connecting together.

9. A switching unit for selectively coupling together three audio subsystems to form a complete audio system, said subsystems being selected one each from a first group having a plurality of source subsystems for originating an audio signal, such as tape-decks, turntables, tuners or the like, a second group having a plurality of amplifier subsystems for amplifying and conditioning the audio signal, and a third group having a plurality of speaker subsystems for producing an audible signal from the amplified and conditioned audio signal, said switching unit comprising a portable, manually operable signal generating means for producing signals which identify the subsystems to be coupled together, switch means for coupling to each subsystem in each group, and responsive to control signals for electrically connecting together subsystems from each group, and control means responsive to said identifying signals for producing and supplying control signals to said switch means to cause the switch means to connect together the subsystems identified by said identifying signals.

10. A switching unit as in claim 9 wherein said switch means includes first switch apparatus having a plurality of first subsystem connections for coupling to the outputs of the source subsystems, a first output connection, and first means responsive to control signals for selectively connecting one of the first subsystem connections to the first output connection, second switch apparatus having a plurality of pairs of second subsystem connections, each pair being coupled to the input and output of a different one of the amplifier subsystems of the second group, a second input connection, a second output connection, and second means responsive to control signals for selectively connecting the input connection and output connection to a pair of second subsystem connections to thereby connect the input of the corresponding amplifier subsystem to the second input connection, and the output of such amplifier subsystem to the second output connection third switch apparatus having a plurality of third subsystem connections for coupling to the inputs of the speaker subsystems, a third input connection, and third means responsive to control signals for selectively connecting the third input connection to one of the third subsystem connections, means coupling the first output connection to the second input connection, and means coupling the second output connection to the third input connection.

11. A switching unit as in claim 10 wherein said signal generating means includes a manually operable three position selector switch for producing first, second and third signals, each signal corresponding to a different setting of the switch for identifying the first, second and third groups respectively, a plurality of manually operable switches, each for producing a different subsystem identifying signal, and cable means for applying the signals produced by the selector switch and by the manually operable switches to said control means.

12. A switching unit as in claim 11 wherein said control means includes first, second and third memory means responsive to said first, second and third signals respectively for storing said identifying signals, and first, second and third decoder means responsive respectively to the signals stored in said first, second and third memory means for producing and supplying control signals respectively to the first, second and third switch apparatus.

13. A switching unit as in claim 12 further including first, second and third display devices responsive to first, second and third display signals respectively for producing a visual indication of indicia identifying the selected source subsystem, amplifier subsystem and speaker subsystem respectively, and first, second and third display decoders responsive respectively to the signals stored in said first, second and third memory means for producing and supplying said first, second and third display signals respectively to said first, second and third display devices.

14. A switching unit as in claim 10 further including a power monitor circuit coupled to said second output connection for producing a signal indicative of the power produced by the selected amplifier subsystem, and watt meter means responsive to said power indicating signal for producing a visual indication of the power level of the selected amplifier subsystem.

* * * * *